(12) United States Patent
Nüesch

(10) Patent No.: US 7,107,751 B2
(45) Date of Patent: Sep. 19, 2006

(54) SAFETY ARRESTER CABLE

(75) Inventor: Walter Nüesch, Amegg (CH)

(73) Assignee: Cortex Humbelin AG, Ruppersvil (CH)

( * ) Notice: Subject to any disclaimer, the term of this patent is extended or adjusted under 35 U.S.C. 154(b) by 0 days.

(21) Appl. No.: 10/495,761

(22) PCT Filed: Nov. 19, 2002

(86) PCT No.: PCT/CH02/00623

§ 371 (c)(1),
(2), (4) Date: Feb. 7, 2005

(87) PCT Pub. No.: WO03/048602

PCT Pub. Date: Jun. 12, 2003

(65) Prior Publication Data

US 2005/0144928 A1    Jul. 7, 2005

(30) Foreign Application Priority Data

Dec. 5, 2001    (CH) .................................... 2220/01

(51) Int. Cl.
*D02G 3/02*    (2006.01)
(52) U.S. Cl. ..................................... 57/237
(58) Field of Classification Search ............... 57/237, 57/238
See application file for complete search history.

(56) References Cited

U.S. PATENT DOCUMENTS

| | | | |
|---|---|---|---|
| 2,347,229 A | 4/1944 | Woodbury | |
| 4,155,394 A | 5/1979 | Shepherd et al. | |
| 4,563,869 A | 1/1986 | Stanton | |
| 4,877,073 A * | 10/1989 | Thise et al. | 152/451 |
| 5,598,831 A * | 2/1997 | Izuta | 124/90 |
| 5,934,168 A * | 8/1999 | Feichtinger et al. | 87/8 |
| 6,601,378 B1 * | 8/2003 | Fritsch et al. | 57/238 |
| 2004/0221937 A1 * | 11/2004 | Dehnert et al. | 152/527 |

FOREIGN PATENT DOCUMENTS

| | | |
|---|---|---|
| DE | 39 03 082 A1 | 8/1990 |
| FR | 1 376 395 A | 10/1964 |
| GB | 2 327 649 A | 2/1999 |
| JP | 07 034344 A | 2/1995 |

OTHER PUBLICATIONS

E.R. Barron: "Hybrid Tire Cords Containing Kevlar Aramid", Kautsguk Und Gummi-Kunststoffe, vol. 40, No. 2, 1987, pp. 130-135, XP002232349, Heidelberg.

* cited by examiner

*Primary Examiner*—Shaun R. Hurley
(74) *Attorney, Agent, or Firm*—McCormick, Paulding & Huber LLP

(57) ABSTRACT

The safety of safety cables may be improved, whereby the system of cable and attachment eye is embodied together such that a greater work-to-break energy is possible. The cable is prepared from a blended yarn, comprising fibres made from relatively rigid, highly tear-resistant plastic filaments from a selection of PBO, carbon fibres and p-aramides and a proportion of fibres made from relatively elastic plastic filaments from selection of m-aramides, PBI, polyurethane (elastane) and polyester. The arrester cable is produced from the blended yarn the ends of which have, for example, been immersed in a resin. The end of the cable thus rests in an attachment eye, comprising a conical tubular section, in which the thickened end of the cable is held by wedging.

9 Claims, 1 Drawing Sheet

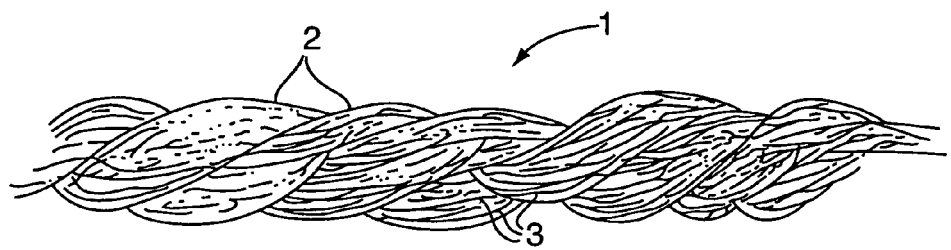
FIG. 1
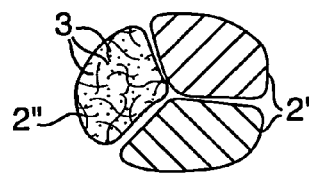
FIG. 2
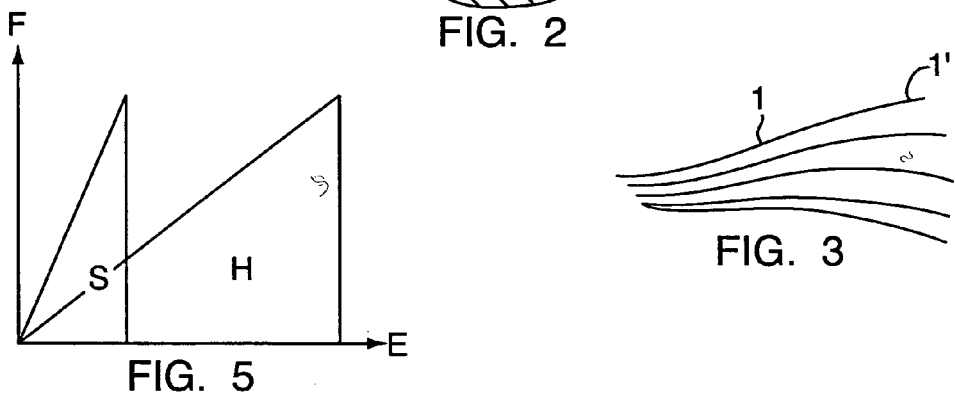
FIG. 3
FIG. 5
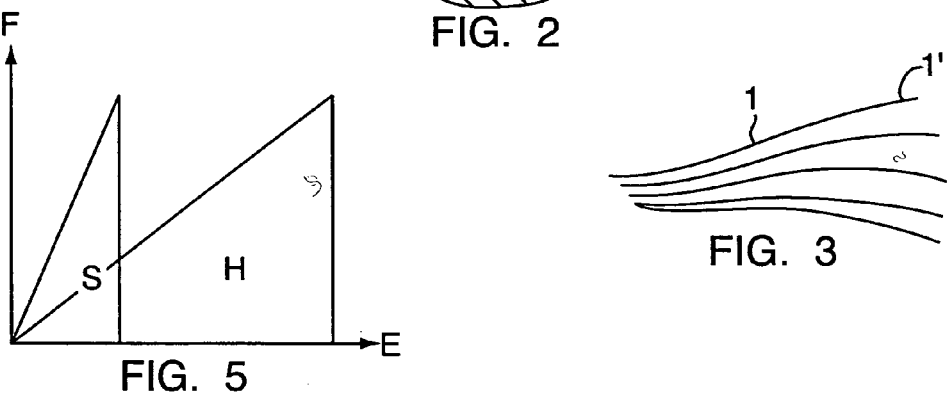
FIG. 4
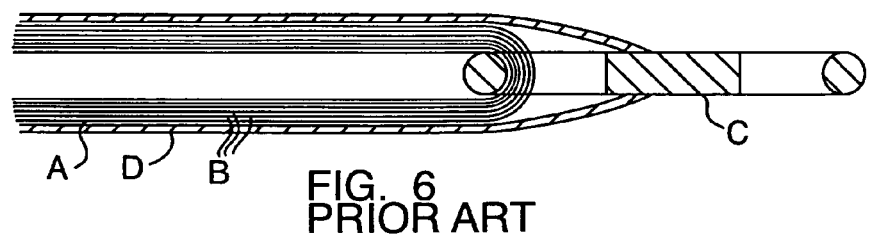
FIG. 6
PRIOR ART

SAFETY ARRESTER CABLE

CROSS-REFERENCE TO RELATED APPLICATIONS

This application is entitled to the benefit of and incorporates by reference essential subject matter disclosed in International Application No. PCT/CH02/00623 filed on Nov. 19, 2002 and Swiss Patent Application No. 2220/01 filed on Dec. 5, 2001.

FIELD OF THE INVENTION

The present invention relates to a safety arrester cable consisting of a cable manufactured of high-strength synthetic fibres and attachment eyes of metal which are fastened to this.

BACKGROUND OF THE INVENTION

Safety arrester cables, in the state of the art are applied where rigid connections are to be able to destroyed under certain conditions, and it is to be ensured that the part which has broken away may not fly off in an uncontrolled manner and on account of this create damage or endanger people.

In motor racing sport it is often the case that with collisions of two vehicles, or of a vehicle with the bordering of the racing track, the wheel axles and their suspension break, and the wheel flies off in an uncontrolled manner or is catapulted away. People at the edge of the racing track have often been injured or even killed by way of this. This problem is known and safety regulations have been imposed to the extent that the wheels must be connected to the body of the vehicle via a safety arrester cable. Until now many grave accidents have been avoided by way of this safety precaution, but despite this, the safety arrester cables applied until now still have an insufficient effect.

On the market today there are fibres or yarns manufactured from these which have a tear strength which is a multiple greater than that of steel fibres. Whilst for example steel fibres have tear strength of 3.0 cN/ dtex, carbon fibres have tear strength of 20 cN/ dtex. The relatively elastic m-aramide fibres also have a tear strength of 4.7 CN/dtex, whilst the rigid p-aramide fibres have a tear strength of 19 CN/ dtex and modern PBO fibres even have tear strength of about 37 cN/dtex. Safety arrester cables which are manufactured from these modern highly tear-resistant fibres, such as carbon fibres, p-aramide fibres and PBO fibres are capable of accommodating tensile forces which indeed far exceed the forces which actually occur.

Accordingly such safety arrester cables have been manufactured of corresponding highly tear-resistant fibres, wherein the corresponding yarns of such highly tear-resistant fibres have been endlessly wound between the two end attachment eyes. The corresponding fibres as a result of this all run parallel to one another. With regard to those accidents which were investigated, one could ascertain that the cable stood up to the forces occurring between the two attachment eyes, whilst it was the attachment eyes which were broken. The construction of such a safety arrester cable according to the state of the art is shown in FIG. 6. The actual cable A is shown in FIG. 6. The actual cable A is manufactured of several endlessly wound loops B and runs through an attachment eye C which here is shown merely schematically. A shrinkage sleeve D is attached over the cable A. As already mentioned, the occurring breakages have always been ascertained at the attachment eye. This is not very surprising since the highly tear-resistant materials usually have an extension up to the breakage extension of 1.5 to maximally 3.5 percent. This in principle could also be compensated by way of manufacturing a correspondingly long safety arrester cable. This however cannot be done since on account of this there exists the danger that the wheel which is attached to the arrester cable could impact the driver. Added to this is the fact that it is indeed in motor racing sport that an as light as possible safety arrester cable with an as low as possible air resistance is desired. Thus it is no solution to manufacture the safety arrester cables of a less high-strength but more elastic material and to design the cable accordingly thicker.

The problem may only be solved by way of observing the cable and the attachment eye as a coherent system, wherein this system must have the best possible work-to-break-energy.

In one article, E. R. Barron "Hybrid Tyre Cords Containing Kevlar Aramid" (Kautschuk+Gummi·Kunstoffe, Vol. 40, 1987, No. 2, pages 130–135) describes the advantages of three-ply so-called hybrid cables which are manufactured from combinations of aramide with nylon, polyester or other textile yarns. Such hybrid yarns compared to pure yarns have an improved elasticity and an increased resistance to fatigue breakage. These facts have been realised in tyre manufacturing technology, not only in motor racing.

It is therefore the object of the present invention to improve a safety arrester cable of the initially mentioned type such that the work-to-break-energy of the whole system of the safety arrester cable is significantly increased and thus a danger of a breakage of the safety arrester cable may be significantly reduced.

SUMMARY OF THE INVENTION

The present invention is directed in one aspect to a safety arrester cable manufactured of high strength synthetic fibers and attachment eyes of metal fastened thereto. The cable is twisted from a blending of threads with relatively rigid synthetic filaments with an extension until breakage of 2 to 5% and also of relatively elastic synthetic filaments with an extension of 12 to 25% until breakage. The yarn strands are twisted in a balanced manner while the cable is twisted in a unbalanced manner.

Preferably, the ends of the threads or the yarn strand ends are provided with a coating thereby forming a cable which thickens towards the open ends. The ends being held by a positive fit in the attachment eyes.

BRIEF DESCRIPTION OF THE DRAWINGS

One preferred embodiment of the subject-matter of the invention is represented in the accompanying drawings and is explained hereinafter. There are shown in:

FIG. 1 is a view of a hybrid yarn created with a Z-twist and

FIG. 2 is a section through the hybrid blended yarn according to FIG. 1

FIG. 3 schematically shows the yarn ends of a detwisted cable which is thickened with a resin coating FIG. 4 shows the end of the safety arrester cable according to the invention, wherein the attachment eye is longitudinally sectioned FIG. 5 shows a diagram of the energy uptake in dependence on time, whilst FIG. 6 schematically shows a known safety arrester cable according to the state of the art, as is used today in motor racing sport.

DETAILED DESCRIPTION OF THE PREFERRED EMBODIMENTS

FIG. 1 shows a view of a hybrid blended yarn section. The yarn section is indicated as a whole at 1. It consists of several twisted threads 2, wherein each thread 2 consists of a bundle of untwisted filaments 3. In the sectioned drawing according to FIG. 2 one recognises that two threads 2' consists of highly tear-resistant, relatively rigid filaments 2' whilst one thread 2" is manufactured of less tear-resistant but elastic material.

With regard to the threads 2' which are manufactured of a relatively rigid synthetic filaments, it is the case of plastic filaments from the selection of PBO (poly-p-phenylene-2, 6-benzobisoxazole), carbon fibres and p-aramides. In contrast to this, the thread 2" consists of filaments of relatively elastic material from the selection of m-aramides, PBI, polyurethane (elastane) and polyester.

Such PBO fibres are offered under the trade description Zylon® of the company Toyobo Co., Ltd in Osaka, Japan. As already initially mentioned, these relatively rigid materials have a tear strength of between 19 and 37 cN/dtex. The elastic thread 2" preferably consists of the selection of m-aramides, PBI and polyester which in contrast have a tear strength of 2.7 to 8 cN/dtex. The threads 2 may be twisted with an S-twist with which the filaments run parallel to the running direction of the threads, or in the Z-direction (Z-twist). It is however essential that the yarn or the yarn strands are twisted in a balanced manner (balanced twist) which ensures a high tear strength whilst the cable manufactured of this yarn or from these yarn strands is twisted in an unbalanced manner (unbalanced) since this effects an additional extension effect.

A so-called O-twist (zero twist) falls under the balanced twist. With this, the untwisted thread is not unwound overend but is fed more or less without tension and with deflection. The usual overend feeding usually effects a tension which leads to an uncontrolled slight twisting so that no balanced twisting would be present.

A cable according to FIG. 4 is twisted from the yarn according to the FIGS. 1 and 2. This cable is preferably manufactured with a Z-twist. With the Z-twist the yarns do not run parallel to the longitudinal direction of the yarn but parallel to the longitudinal direction of the cable. Whilst with the S-twist as in FIG. 1 an increased force transmission from the rigid threads 2' to the elastic threads 2" is effected, wherein a yarn practically arises which has the physical properties of the mixture, the Z-twist ensures the retention of the properties of the blended yarn. The end properties of the cable may be adapted to the application profile with the selection of the yarn.

Thanks to the particular shaping of the cable itself, despite the enormously high tear strength, an increased extension is also effected, by which means an improved energy uptake (work-to-break energy) is achieved. With regard to thus the diagram in FIG. 5 is referred to. Here on the abscissa the force F is plotted and on the ordinate the elasticity E. The respective hatched areas represent the possible energy uptake until breakage. Whilst the small area S for example shows the work-to-break-energy of steel (S), the area H represents the work-to-break-energy of the hybrid design selected here. This however may only be achieved by way of designing the attachment eye 4 in a suitable manner as well as the accommodation of the cable 5 in the attachment eye 4. The attachment eye 4 has a conical tube section 6 which is open at both sides. The opening 7 with the smaller diameter lies towards the cable whilst the opening 8 with the larger diameter is distant to the cable. An attachment bow 9 is present via the opening with the larger diameter. The attachment bow 9 may be manufactured as one piece with the conical tube section 6 or may be connected to this by welding. The complete attachment eye 4 is manufactured of a hardened steel which is additionally hardened with a vacuum solder layer.

For fastening the cable 5 in the attachment eye 4, the open end of the cable 5 is detwisted in this region and the ends 1' of the yarn sections are immersed in a resin. The ends 1' are thickened by way of this. The end of the cable 5 is accordingly thicker than the cable itself. This thickened end of the cable 5 is wedged by way of the tension in the conical tube section 6 of the attachment eye 4.

If the safety arrester cable according to the invention comes into effect due to a destruction of the connected parts which are rigid per se, then in the first moment a part of the energy is accommodated by way of the extension of the cable 5. The transition of the forces from the cable to the attachment eye is then effected with a certain elasticity with which deformation work is carried out and the energy tips are flattened. At the same time the intermediate spaces remaining between the thickened end regions are destroyed on wedging and at the same time the resin is highly compressed.

In order to increase the work-to-break energy, it is possible to provide the inner surface of the conical tube section 6 with a coating 10. Such a coating may for example consist of a thin layer of plastic or vulcanised rubber.

Whilst the present invention is preferably operated for use in motor car racing for securing the wheels given a axle breakage, further technological applications are absolutely conceivable. For example a use with trailer coupling would be possible.

The invention claimed is:

1. A safety arrester cable comprising:
   a cable manufactured of high-strength synthetic fibres and attachment eyes of metal fastened thereto, wherein the cable is twisted from blended yarns of threads with relatively rigid synthetic filaments with an extension until breakage of 2 to 5%, and of relatively elastic synthetic filaments with an extension until breakage of 12 to 25%, wherein the yarns strands are twisted in a balanced manner (balanced twist) whilst the cable manufactured from these yarns strands is twisted in an unbalanced manner.

2. A safety arrester cable according to claim 1, wherein the ends of the threads or the yarn strand ends are provided with a coating and thus a cable which thickens towards the open ends is formed, wherein these two ends are held with a positive fit in attachment eyes.

3. A safety arrester cable according to claim 1, wherein the relatively rigid synthetic filaments consist of a selection of PBO (poly-p-phenylene-2,6-benzobisoxazole), carbon fibres and p-aramides.

4. A safety arrester cable according to claim 1, wherein the relatively elastic synthetic filaments consist of a selection of m-aramides, PBI, polyurethane (elastane) and polyester.

5. A safety arrester cable according to claim 1, wherein the blended yarns threads are twisted with a Z-twist, S-twist or O-twist into cords and these cords are twisted into a cable.

6. A safety arrester cable according to claim 1, wherein the coating of the threads in the end region is effected by immersing the threads in a hardening resin or mixtures.

7. A safety arrester cable according to claim 1, wherein the attachment eyes on the inner side of the conical tube section are provided with a coating which increases the friction.

8. A safety arrester cable according to claim 7, wherein the coating is a rubber layer which has been vulcanised on.

9. A safety arrester cable according to claim 1, wherein the attachment eye is hardened by depositing a vacuum solder layer.

* * * * *

UNITED STATES PATENT AND TRADEMARK OFFICE
CERTIFICATE OF CORRECTION

PATENT NO. : 7,107,751 B2  Page 1 of 1
APPLICATION NO. : 10/495761
DATED : September 19, 2006
INVENTOR(S) : Walter Nüesch It is certified that error appears in the above-identified patent and that said Letters Patent is hereby corrected as shown below:

On the title page item (75), delete the name "Amegg" and replace it with the name --Arnegg--.

On the title page item (73), delete the name "Cortex Humbelin AG" and replace it with the name --Cortex Hümbelin AG--.
On the title page item (73), delete the name "Ruppersvil" and replace it with the name --Rupperswil--.

On the title page item (56), Other Publications:
Delete the name "Kautsguk Und Gummi-Kunststoffe" and replace it with the name --Kautschuk + Gummi Kunststoffe--.

Column 2, line 18, delete the word "yams" and replace it with the word --yarns--.

Signed and Sealed this

Ninth Day of January, 2007

JON W. DUDAS
*Director of the United States Patent and Trademark Office*